Figure 1:
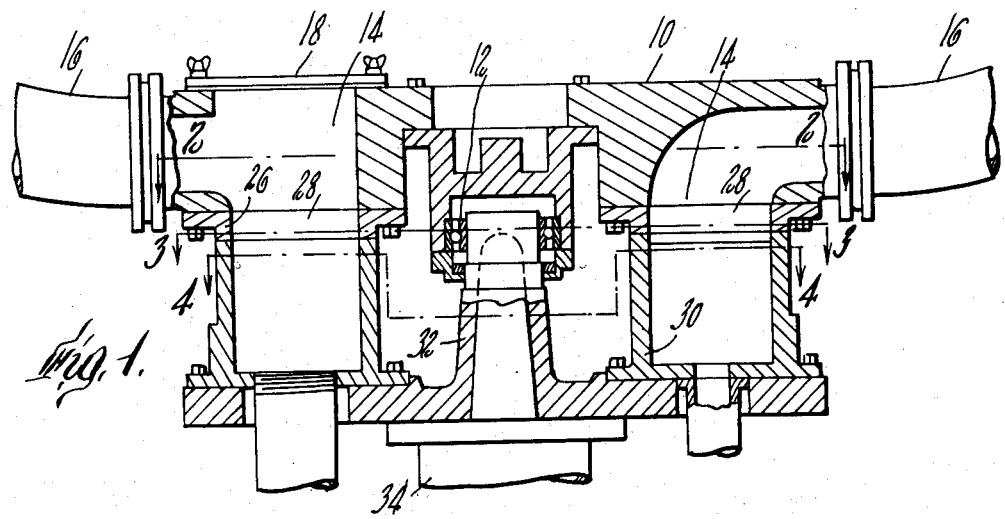

Jan. 8, 1963     J. T. ROOS     3,072,136
VALVE FOR FILTER
Filed Oct. 30, 1959     2 Sheets-Sheet 1
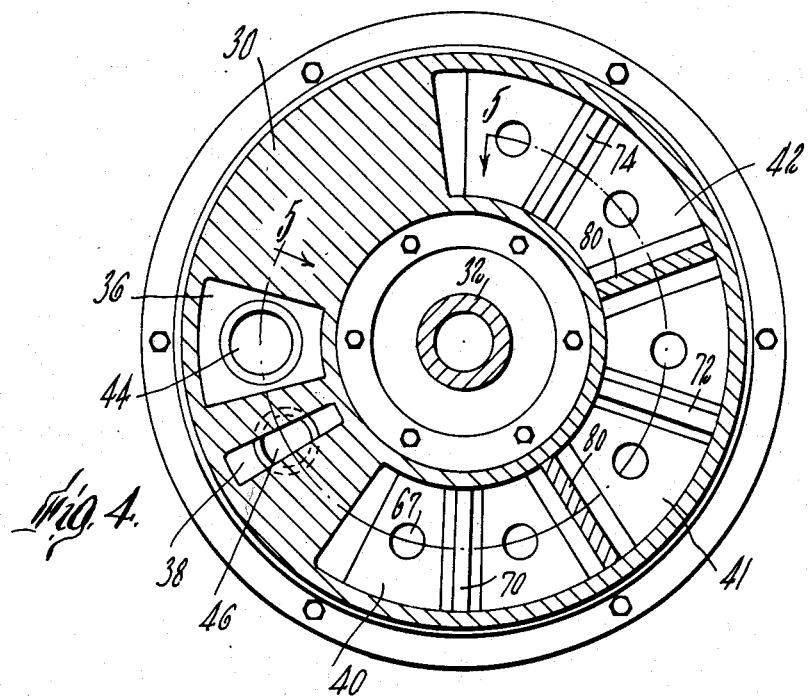
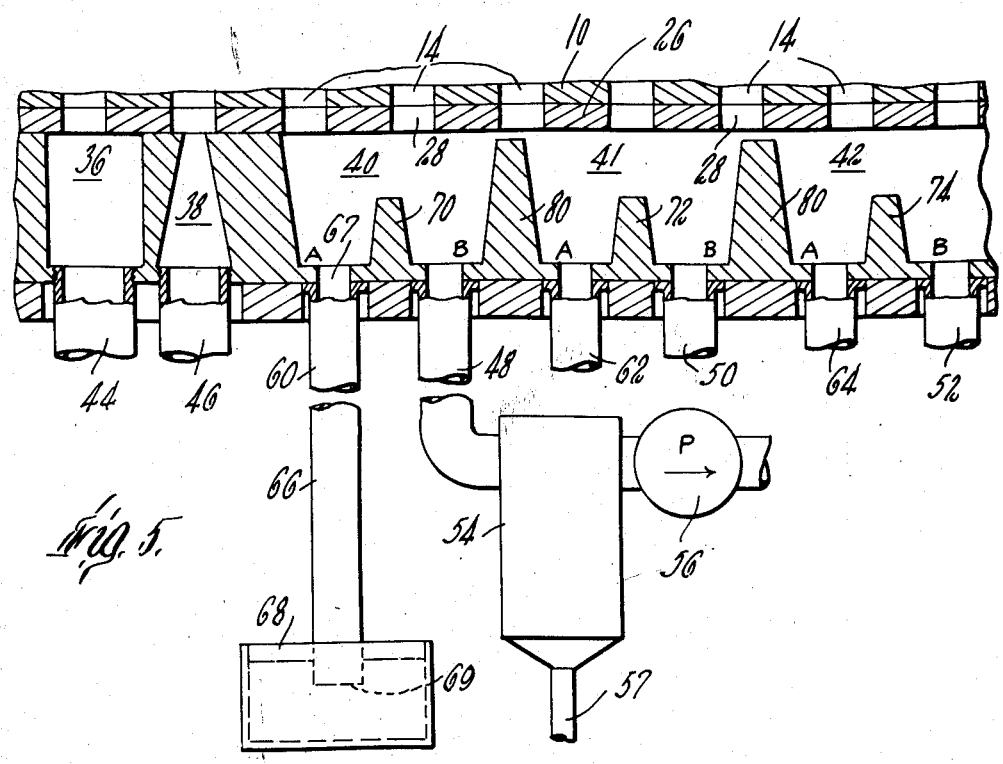

Jan. 8, 1963   J. T. ROOS   3,072,136
VALVE FOR FILTER

Filed Oct. 30, 1959   2 Sheets-Sheet 2

United States Patent Office 3,072,136
Patented Jan. 8, 1963

3,072,136
VALVE FOR FILTER
John T. Roos, Westwood, Mass., assignor to Bird Machine Company, South Walpole, Mass., a corporation of Massachusetts
Filed Oct. 30, 1959, Ser. No. 849,914
8 Claims. (Cl. 137—197)

This invention relates to a distributor or valve for controlling the flow of fluids in sequence through a plurality of ports and pertains more specifically to a distributor for use with moving cell filters or concentrators of either the belt or rotary type.

In moving cell filters, each cell while moving in a closed path is subjected to a series of operations carried out in sequence. The slurry or material to be filtered is deposited in each cell in succession as it passes a given point of its travel, the mother liquor is sucked off, wash water is flowed onto the filter cake and sucked off, the latter operations usually being repeated one or more times, and finally each cell in turn is inverted to permit the filter cake to drop out. The last operation may be facilitated or accelerated by an air or stream blast. If desired, the distributors of the present invention can be employed to control the starting and stopping of all operations involving fluid flow to and from the individual filter cells, but usually it is more convenient to have a separate distributor control the supply of liquid to be filtered and the supply of wash water, leaving the remaining operations to be controlled by the present distributor.

In applying suction to the cells to remove the mother liquor or the wash water, it has been found impossible to predict in advance exactly how long a time will be required for a given suction to remove all of the liquid, or exactly when air will begin to be sucked through the filter cake along with the liquid, the time varying considerably depending upon the nature (e.g., particle size and shape) and quantity of filterable solids present in the slurry, as well as upon the temperature and viscosity of the liquid and the uniformity of its distribution on the filter surface of the cell. There may be a substantial variation in the time required for removal of liquid in going from one cell to the next in a series because of failure to provide thorough mixing of the material to be filtered or because all of the cells may not be perfectly level, among other reasons. Consequently, it is impossible as a practical matter to adjust the distributor to turn off the suction as soon as air begins to be sucked through the filter cake. In the past, the expansion of air as it passes through the filter cake into the low pressure zone produced by the suction pump produced a marked cooling effect, causing the piping, particularly in the barometric leg adjacent the outlet end of the pipe, to become chilled. This leads to the growth of crystals on the inner wall of the pipe, reducing the flow rate through it and requiring frequent cleaning to avoid plugging.

One object of the present invention is to provide a distributor of improved construction which prevents that portion of the piping adjacent its outlet end from becoming chilled because of the expansion of air sucked through the filter cake.

Another object is to provide an improved distributor or valve of the type described having improved efficiency and reduced maintenance costs.

Still another object is to provide a device which facilitates recovery of the maximum amount of mother liquor and of wash water and which reduces the load on separating tanks used to separate entrained liquid droplets from air drawn through the filter.

Other and further objects will be apparent from the drawing and from the description which follows.

Figure 2:
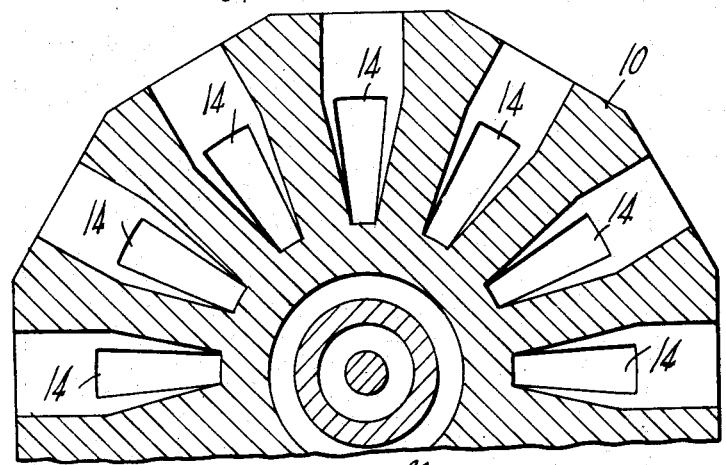
Figure 3:
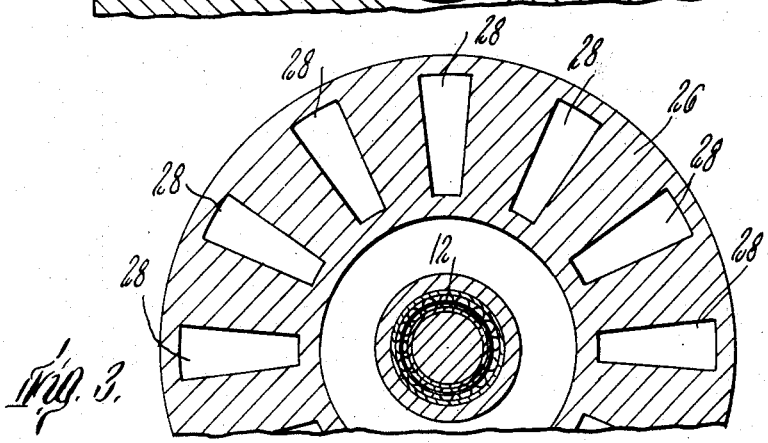

In the drawing:
FIG. 1 is a view in side elevation, partly broken away and in section, showing one embodiment of the present invention;
FIG. 2 is a view in section taken along line 2—2 of FIG. 1;
FIG. 3 is a view in section taken along line 3—3 of FIG. 1;
FIG. 4 is a view in section taken along line 4—4 of FIG. 1; and
FIG. 5 is a view in section taken along line 5—5 of FIG. 4 and showing in addition the arrangement of storage tank and suction pump connected to the distributor.

The embodiment of the distributor illustrated in the accompanying drawings is described as employed in conjunction with a rotary tilting cell type filter. It will be understood, however, that the distributor may also be employed in conjunction with moving cell filters of the linear belt type or of the rotary type in which the filter cake is scraped or otherwise removed from the surface of the cells without tilting them.

As shown in the drawing, the rotary filter embodies a manifold 10 of generally circular configuration which is mounted for rotation about its center on centering bearing 12. Manifold 10 includes a plurality of ports 14, 14 in annular array, each port being connected by means of a hose 16 with the outlet side of an individual filter cell beneath the filtering member or cloth. An inspection port 18 is provided in the upper face of manifold 10 to permit observation of and access to the interior of the distributor. To the bottom of manifold 10 is secured, by bolting, a sealing ring 26 made of suitable bearing material and provided with ports 28, 28 corresponding to ports 14, 14. Sealing ring 26 forms a flat bottom bearing face perpendicular to the axis of rotation of manifold 10 and is in rotary sliding sealing engagement with the upper face of a stationary head 30 which is fixed in position by bolting to the base of pedestal 32 on the upper end of which bearing 12 is mounted. Pedestal 32 may be supported in fixed position on the top of any suitable supporting foundation 34.

The upper face of head 30, as best appears in FIG. 4, is provided with a plurality of orifice means or chambers 36, 38, 40, 41, 42 arranged to be brought into communication with successive ports in the manifold as the manifold rotates on its axis. Within each orifice or chamber 40, 41, 42 there is provided a partition or barrier 70, 72, 74 extending transversely of the direction of sliding movement of the manifold 10 with respect to the head 30 and dividing each orifice into two compartments A, B arranged so that during operation of the distributor, compartment A is brought into communication with each port 14, 28 before corresponding compartment B. Partitions 70, 72, 74 may be mounted by bolting or otherwise securing them to the walls of head 30 and may be adjustably fixed in varying locations so as to adjust the relative size of compartments A and B. This adjustment may be made by removing access closure 18. The upper margin of each partition 70, 72, 74 is spaced from the interface between the manifold 10 and the head 30 so as to permit flow of fluid laterally from compartment A to compartment B over the top of the partition. The portion 80 of the head which separates the several orifices 40, 41, 42 may be but need not be in sealing engagement with the bottom face of sealing ring 26.

A conduit or passageway 44 connects orifice 36 with a source of air or steam under pressure while conduits or passageways 48, 50, 52, extending from the bottom of orifice 38 and of compartments 40B, 41B and 42B, are all connected through a mist-removing or separating tank 54 with a vacuum or suction pump 56. Conduit 46 is also connected to a source of suction, but because this conduit is required to handle a large volume of air (for reasons pointed out below) with a relatively small drop in pressure, it is usually desirable to provide a separate, individual separating tank and suction pump (not shown) for this conduit. Separating tank 54 is provided with a liquid drain 57 at its bottom which is preferably in the form of a barometric leg and which may discharge into storage tank 68. Conduits or passageways 60, 62, 64 which extend from the bottom of compartments 40A, 41A and 42A are connected through a barometric leg 66, which serves to maintain a pressure differential between inlet 67 and outlet 69 of the conduits, to a liquid storage tank 68. It will be understood that while a single tank 68 has been shown for purposes of illustration, two or more tanks may be used so as to maintain various liquids separate from each other. Indeed, if desired, for reasons which will be pointed out below, an individual barometric leg and tank may be provided for conduit 60 while the remaining conduits 62, 64 may all be provided with a single leg and storage tank common to all, or all of the conduits may have individual storage tanks.

In operation of the device in conjunction with a moving-cell-type filter, the liquid to be filtered is supplied to each individual cell as its corresponding ports 14, 28 are passing from orifice 38 to orifice 40 (from left to right as seen in FIG. 5). As its port comes into communication with compartment A of orifice 40, it is subjected to the low pressure provided by vacuum or suction pump 56 communicating through tank 54 and passageway 48 with the interior of the orifice. The liquid filtrate or mother liquor passing through ports 14, 28 flows directly into passageway 60 at the bottom of compartment A and through the barometric leg 66 into storage tank 68. As the ports 14, 28 continue to move to the right as seen in FIG. 5, the supply of mother liquor will continue until, at some indefinite point approximately when ports 14, 28 pass over the top of partition 70, the supply is exhausted and air begins to be sucked through the filter cake and through filter ports 14, 28. This air with a small quantity of entrained liquid particles or mist does not flow directly into passageway 60, but instead is withdrawn laterally into compartment B and thence through passageway 48 and separating tank 54, where entrained mist or liquid droplets are removed, to vacuum pump 56. Accordingly, any cooling of the conduits or passageways as a result of the expansion of the air is substantially confined to compartment B and passageway 48, and passageway 60 receives essentially only liquid. If the flow of mother liquor continues longer than usual, any which enters passageway 48 will be trapped in tank 54.

As ports 14, 28 continue to move to the right as seen in FIG. 5 and pass over the sealing face of head 30 into communication with orifice 41, wash water is flowed onto the cell to which this port is connected, and the separation or removal of the wash water proceeds as ports 14, 28 pass across orifice 41 and above partition 72 in the same manner as described for removal of mother liquor in the preceding orifice. A second washing operation is carried out in precisely the same manner while ports 14, 28 move across and in communication with orifice 42.

Any liquid droplets entrained in the air passing through passageways 48, 50, 52 are permitted to settle out at the bottom of tank 54, from which the liquid flows through drain 57 and a barometric leg into a suitable storage tank which may be the same as or different from the storage tank or tanks for mother liquor and wash water.

After the last washing operation has been completed, the cell is inverted to permit the filter cake to drop out; and the corresponding ports 14, 28 come into communication with orifice 36, through which a blast of air or steam is introduced by means of conduit 44, serving to ensure complete removal of the filter cake. The cell is then returned to its original upright position as its corresponding ports 14, 28 come into communication with orifice 38, through which suction is applied to withdraw rapidly a relatively large volume of air to ensure removal of any small amount of liquid which may have been trapped in the cell and to restore the filter cloth to its original flat condition in preparation for receiving a new charge of liquid slurry to be filtered.

Although specific embodiments of the invention have been described herein, it is not intended to limit the invention solely thereto, but to include all of the obvious variations and modifications within the spirit and scope of the appended claims.

What is claimed is:

1. A distributor system adapted to control the flow of fluids through a plurality of ports in sequence comprising a manifold having a face provided with an array of ports arranged in sequence, a head having a face mounted for sliding movement with respect to the opposing face of said manifold and having an orifice in its face adapted to be brought into communication with successive ports during said sliding movement, a partition within said orifice having its margin spaced from the interface between said manifold and said head and extending transversely of the direction of said sliding movement to divide said orifice into first and second compartments, a first passageway extending from said first compartment for conducting liquid therefrom and including means for withdrawing liquid only through said first passage and for maintaining a pressure differential between its inlet and its outlet ends, a second passageway extending from said second compartment, and a suction means communicating with the outlet end of said second passageway for withdrawing air from said passageway, said compartments being arranged to bring said first compartment into communication with each said port before said second compartment is brought into communication with the same port during said sliding movement.

2. A distributor system as defined in claim 1 in which said means for withdrawing liquid only and for maintaining a pressure differential comprises a barometric leg.

3. A distributor system as defined in claim 1 in which said second passageway includes means for separating entrained liquid from the air stream withdrawn by said suction means.

4. A distributor system as defined in claim 3 in which said separating means comprises a tank.

5. A distributor system adapted to control the flow of fluid through a plurality of ports comprising a manifold having a face provided with an annular array of ports arranged about a central axis perpendicular to said face, a head having a face in sealing engagement with the face of said manifold, said manifold and head being mounted for rotary sliding movement with respect to each other about said axis and said head having an orifice in its face arranged to be brought into communication with successively different ports during rotation, a partition within said orifice having its margin spaced inwardly from the face of said head, said partition extending transversely of said annulus to divide said orifice into first and second compartments arranged so that the first compartment precedes the second compartment in communicating with each port during said rotation, a first passageway extending from said first compartment for conducting liquid only therefrom and including means for maintaining a pressure differential between its inlet and its outlet ends, a second passageway extending from said second compartment, and a suction means communicating with the outlet end of said second passageway for withdrawing air from said passageway.

6. A distributor system adapted to control the flow of fluids through a plurality of ports in sequence comprising a manifold having a face provided with an array of ports arranged in sequence, a head having a face mounted for sliding movement with respect to the opposing face of said manifold and having orifice means in its face adapted to be brought into communication with successive ports during said sliding movement, separate means for withdrawing air from said orifice means, a liquid conducting passageway extending from said orifice means, means for preventing flow in said liquid conducting passageway in a direction toward said orifice means and for preventing the flow of air through said passageway, said liquid conducting passageway coacting with said orifice means in such a manner that liquid will flow from a port in registration with said orifice means to the liquid conducting passageway, said orifice means, separate means and passageway being constructed and arranged in such a manner to prevent substantially any liquid from being drawn into said separate means at least during a given position of one of said ports relative to said orifice means.

7. A distributor system as defined in claim 6 in which said air-withdrawing means includes means for separating entrained liquid from the air stream and a suction pump connected to said separating means.

8. A distributor system as defined in claim 6 in which said flow preventing means comprises a barometric leg.

References Cited in the file of this patent

UNITED STATES PATENTS

| | | |
|---|---|---|
| 1,266,566 | Eby | May 21, 1918 |
| 1,943,618 | Moore | Jan. 16, 1934 |
| 2,797,707 | Hursh | July 2, 1957 |

FOREIGN PATENTS

| | | |
|---|---|---|
| 1,120,254 | France | Apr. 16, 1956 |